Figure 1:
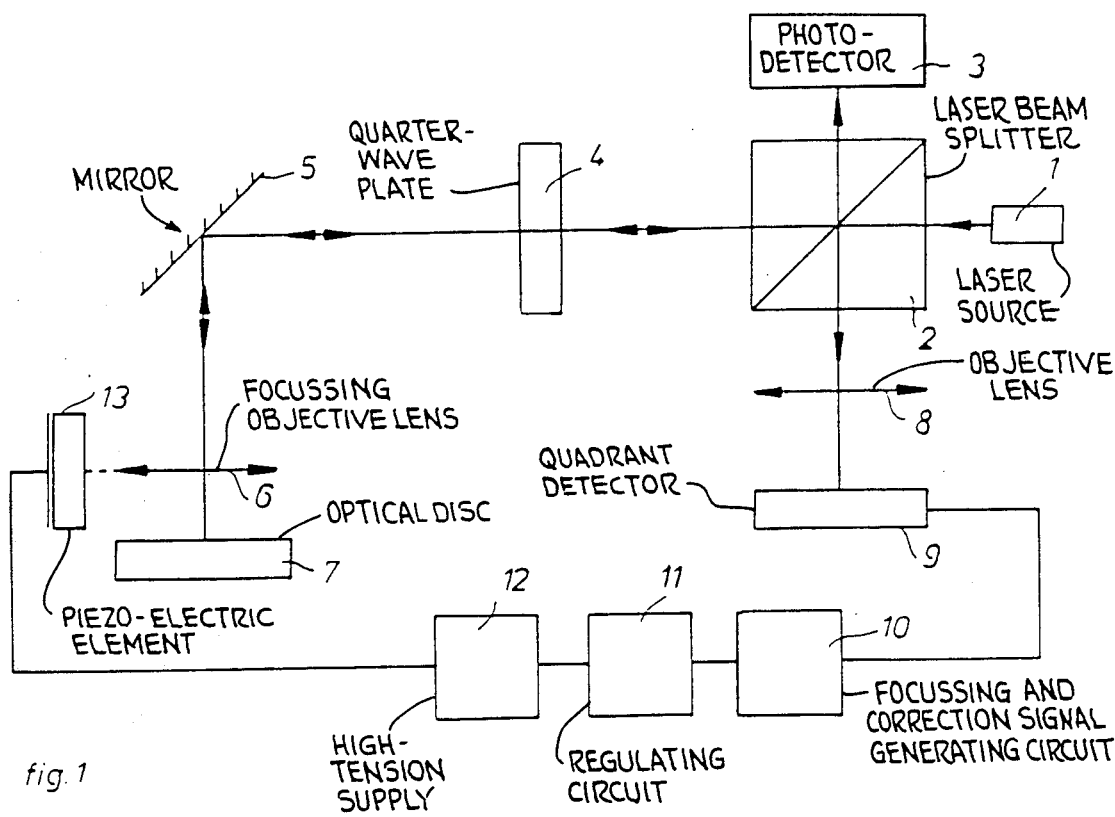

United States Patent [19]

Struye

[11] Patent Number: 4,626,673

[45] Date of Patent: Dec. 2, 1986

[54] DEVICE FOR ACCURATELY FOCUSSING A LASER BEAM

[75] Inventor: Luc A. Struye, Poperinge, Belgium

[73] Assignee: AGFA-Gevaert, N.V., Mortsel, Belgium

[21] Appl. No.: 719,822

[22] Filed: Apr. 4, 1985

[30] Foreign Application Priority Data

Apr. 5, 1984 [EP] European Pat. Off. ........ 84200476.4

[51] Int. Cl.$^4$ .............................................. G01J 1/20
[52] U.S. Cl. .................................................. 250/201
[58] Field of Search ................ 365/215; 250/200, 201, 250/203 R, 204, 206, 208, 216, 568, 578, 234

[56] References Cited

U.S. PATENT DOCUMENTS 4,482,803 11/1984 Lacotte et al. ...................... 250/201

Primary Examiner—Eugene R. LaRoche
Assistant Examiner—D. C. Mis
Attorney, Agent, or Firm—A. W. Breiner

[57] ABSTRACT

Device for correcting deviations upon focussing a laser beam, which comprises electronic means, among which a quadrant detector, for forming with the output signals of said quadrant detector a correction signal $-K_1 V_c H_c / \Sigma$ (18), which is added (19) to the focussing signal $(A+C)-(B+D)$ formed in circuit 14, A, B, C and D being the output signals of the quadrant detector (9a, 9b, 9c, 9d), $$V_c = (A+B) - (C+D)$$

formed in circuit 15;

$$H_c = (A+D) - (B+C)$$

formed in circuit 17;

$$\Sigma = A+B+C+D$$

formed in circuit 16 and $K_1$ being a constant.

2 Claims, 7 Drawing Figures a.

b.

c.

d.

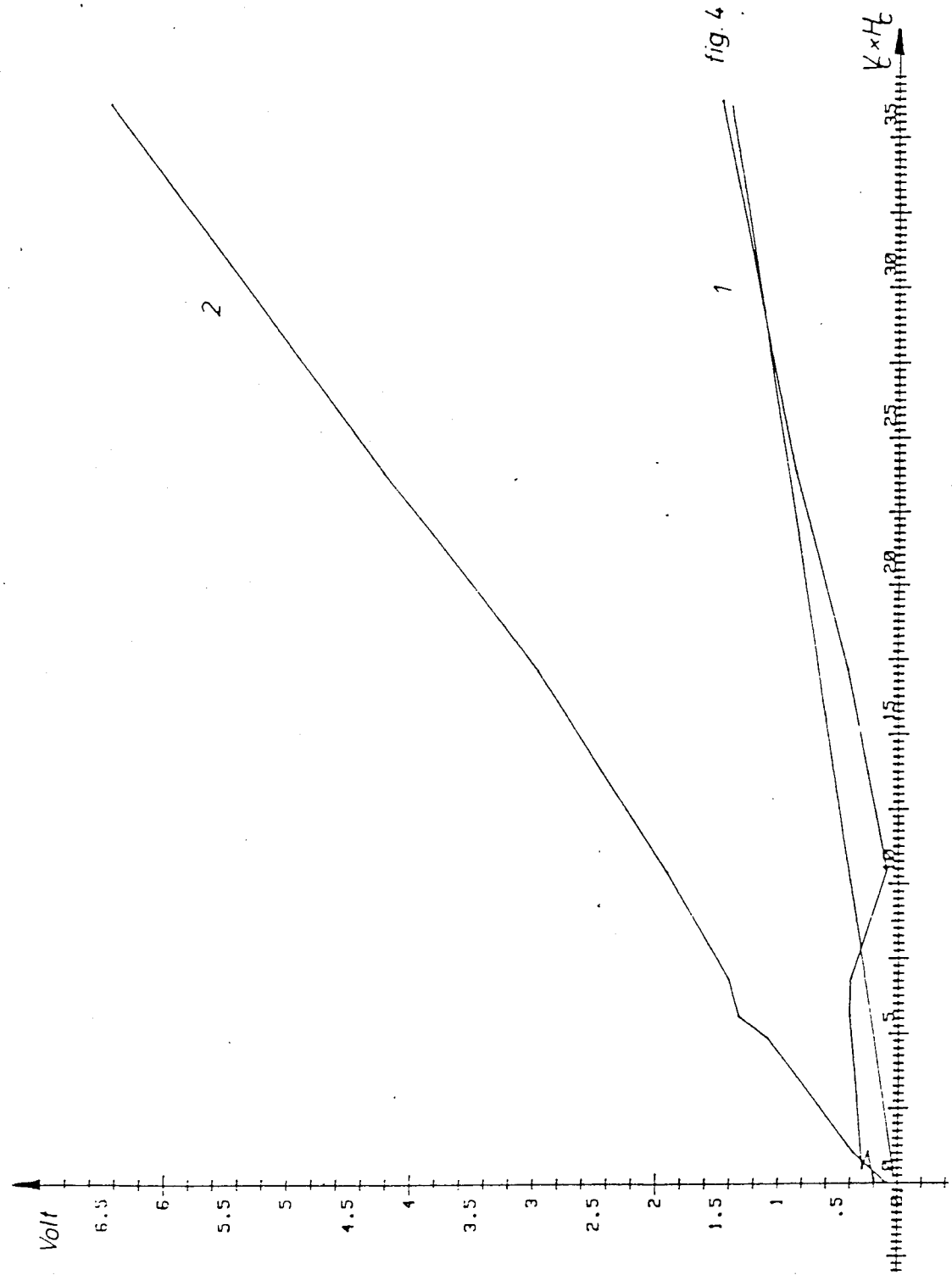

DEVICE FOR ACCURATELY FOCUSSING A LASER BEAM

The present invention relates to a device for focussing a laser beam provided with a laser source, optical components for directing the laser beam to an object, mechanical parts for regulating the optical means and electronic means for controlling the adjusting organs, which electronic means comprise a quadrant detector that can emit four output signals and to which a part of the laser beam which is reflected by the object is directed.

Accurate focussing of a laser beam is necessary, e.g., upon writing-on, in fact burning in, and reading-off data on a so-called optical disc. In order to obtain on such an optical disc an information density as high as possible, the diameter of the laser beam should be as small as possible. With both the wavelength of the laser beam and the focal length of the objective lens applied for focussing the laser beam used in such systems, the depth of field of the laser beam on the optical disc usually is not larger than 1 $\mu$m. Hence, focussing the laser beam should likewise have such an accuracy.

Because the optical disc is displaced under the focussing objective lens during writing-in or reading-out of data, and the distance between this objective lens and the optical disc can variate by the slope or tilt of the disc, a continuous automatic regulation of focussing is necessary. This regulation has not only to be accurate, it should be rapid too. For a writing speed in of 10 Herz, e.g., a slope of 50 ms is required for focussing.

For regulating the objective lens with respect to the optical disc, e.g. a piezo-electric element can be used, which is controlled by a high tension that is regulated via an electronic circuit. The output signal of this electronic circuit is determined by collecting a part of the laser beam reflected by the optical disc on a so-called quadrant detector, which comprises photodetectors being equally distributed over four quadrants. Upon adequately focussing, the spot on the detector is then circular, whereas it is elliptic when focussing is faulty.

Such a regulation of focussing of a laser beam appeared to be not sufficiently accurate as a result of the so-called "wander effect". This wander effect implies that the center of the laser beam moves on the quadrant detector, when the focussing objective lens is moved with respect to the optical disc.

Consequently, only in one position of the objective lens the laser beam is rightly positioned with respect to the quadrant detector, so that only then a right regulating signal for setting the objective lens is obtained, whereas a faulty regulating signal is generated in any other position of the objective lens.

The object of the invention is to provide a relatively simple correction of the wander effect, whereby the deviations in the regulation signal can be minimized so that a better focussing of the laser beam on the optical disc is possible.

For that purpose the invention provides a device for focussing a laser beam on an object provided with a laser source, optical components for directing the laser beam to the object, mechanical and electronic means for controlling and correcting adjusting organs for the optical components. These electronic means comprise a quadrant detector that collects a part of the reflected laser beam and detects form changes of the reflected laser spot as a result of faulty focussing.

Said electronic means also comprise a regulating circuit controlled by a focussing signal that has been formed with the output signals of the quadrant detector and assumes the value $(A+C)-(B+D)$ where A, B, C and D are the output signals of each of the quadrants of the quadrant detector, if these quadrants are passed through clockwise starting at the top left first quadrant.

According to the present invention electronic means are provided in addition thereto for correcting the fault arising upon focussing as a result of the faulty centring of the quadrant diode and the laser beam by generating by means of the four starting signals of the quadrant detector a correction signal for the fault which is proportional to the value "$-V_c H_c / \Sigma$" wherein $$V_c = (A+B)-(C+D),$$

$$H_c = (A+D)-(B+C)$$

and $$\Sigma = A+B+C+D;$$

which correction signal is added to the focussing signal for controlling the regulating circuit.

It has appeared that upon applying the command signal according to the invention, the influence of the fault in centring the laser beam on the quadrant detector as a result of the focussing objective lens can be reduced considerably.

Normally the measuring signal would equal $(A+C)-(B+D)$ so that the term $V_c H_c / \Sigma$ constitutes a correction term.

Owing to the fact that a number of simplifications have been applied upon establishing the correction term, the correction turns out to be even better if this term equals:

$$-K_1 \frac{V_c H_c}{\Sigma}$$

wherein $K_1$ is a constant depending on the selected parameters of the optical components and the dimensions of the axes of the quadrant detector. In practice, this constant lies between the values 1 and 2.

If desired, it is also possible to compensate for variations in the intensity of the laser beam. The command signal then is:

$$\frac{K_2}{\Sigma}[(A+C)-(B+D)] - K_1 \frac{V_c H_c}{\Sigma} \quad (2)$$

wherein $K_2$ is a constant.

Such a correction is only necessary in those cases where a correction for variations in the intensity of the laser beam is not already carried out elsewhere in the focussing device.

Figure 2:
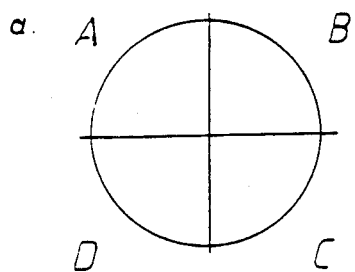
Figure 2:
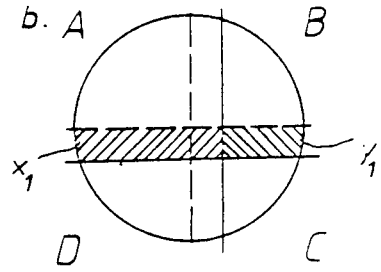
Figure 2:
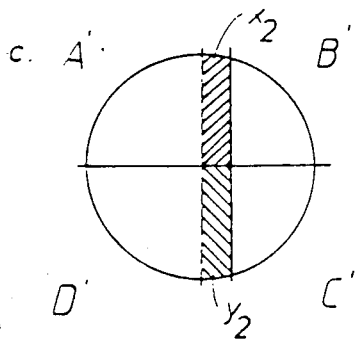
Figure 2:
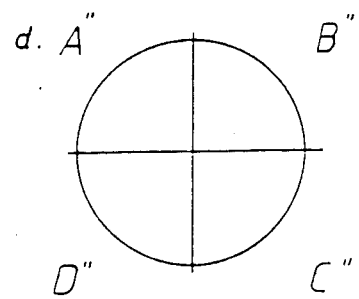
Figure 3:
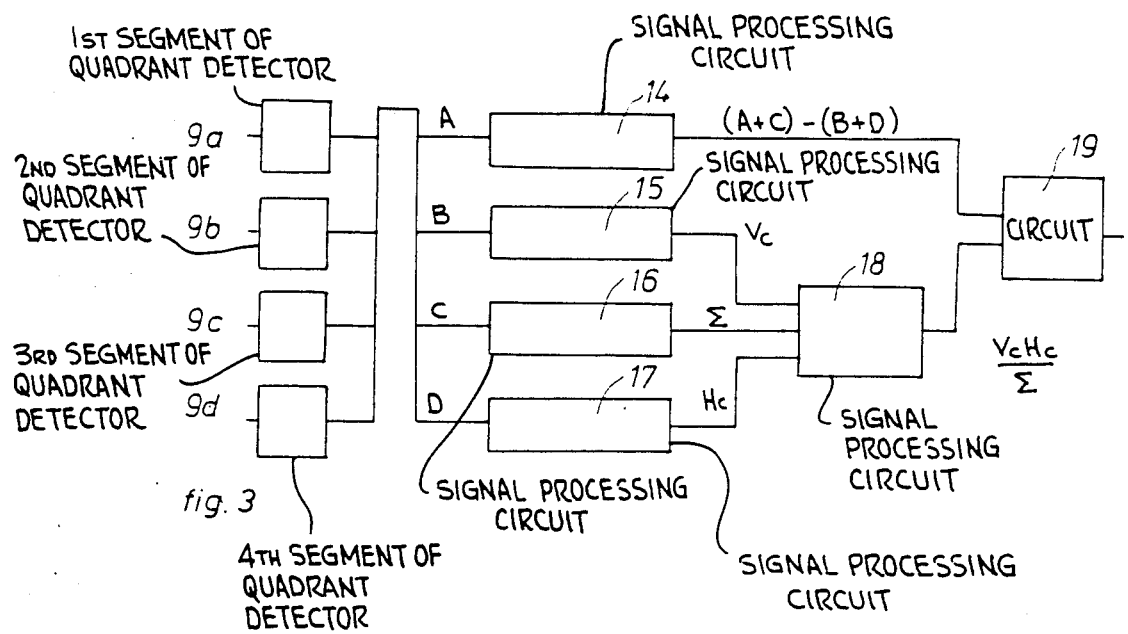

An embodiment of the present invention selected by way of example, will now be described with reference to the accompanying drawings in which:

FIG. 1 schematically represents the structure of an embodiment for focussing a laser beam onto an optical disc, FIGS. 2a to d are some schematic representations of a laser beam on a quadrant detector for explaining the calculation of the correction term according to the present invention, FIG. 3 schematically represents the structure of a possible electronic circuit for generating the command signal, and FIG. 4 represents the course of the corrected focussing signal and uncorrected focussing signal upon simulation of the wander effect by making changes to the position of the quadrant detector in the horizontal plane.

FIG. 1 schematically represents the structure of a focussing device for a laser beam wherein the correction according to the present invention can be carried out.

In FIG. 1 a laser source is indicated with reference number 1 from which a laser beam is directed to a beam splitter 2 directing the beam partly to a photodetector 3, which is used for stabilising the intensity of the laser beam and to a quarter-wave-plate 4, the object of which will be described below. Via the quarter-wave-plate the laser beam reaches a mirror 5 and by this mirror via a focussing objective lens 6 is directed to the optical disc 7. Depending on the application the laser beam reads out data from the optical disc or writes in data on it. The position of the focussing objective lens with regard to the optical disc can be regulated by means of a piezo-electric element 13.

Part of the laser beam is reflected by the optical disc via the objective lens 6 to mirror 5 and from there via the quarter-wave-plate 4 towards the beam splitter 2. As a result of the action of the quarter-wave-plate the reflected beam is rotated twice 90° in phase with respect to the original laser beam. As a result thereof the beam splitter reflects the phase-inverted beam to an objective lens 8, which images the beam on a quadrant detector 9. As known in itself, this quadrant detector consists of four quadrants, each containing a photodetector. The output signals of each of these photodetectors, to be named A, B, C and D hereinafter, are added to the circuit 10 according to the present invention.

The output signal of circuit 10, which will be described more detailedly hereinafter, is coupled to a regulating circuit 11, which takes care of the actual control of the high-tension supply 12, the output signal of which commands the piezo-electric element 13.

The regulating circuit is dimensioned such that if the laser beam impinges on the quadrant detector 9 in a completely symmetrical way so that the output signals A, B, C and D equal one another, the laser beam is optimally focussed on the optical disc 7, whereas in the case of an elliptic beam hitting the detector, a command signal is generated.

As already mentioned above, the center of the laser beam on the quadrant detector appears to move when the position of the focussing objective lens 6 varies with respect to the optical disc 7. The cause of this fault, the wander effect, arises by the impossibility of optimally aligning the different optical components according to FIG. 1.

If the optical axis of the laser beam is not perfectly parallel to the optical axis of the objective lens 6 and not perfectly perpendicular to the normal on the optical disc, any movement of the objective lens 6 causes a shift of the laser beam with respect to the quadrant detector.

Hereby the quadrant detector generates a not completely right signal for regulating the objective lens, so that focussing of the laser beam onto the optical disc is not optimal. Circuit 10 has now been executed in such a way that it carries out a correction on the output signals of the quadrant detector 9, whereby the influence of the shift of the centre of the laser beam on the quadrant detector is nullified for the greater part upon settling the regulating signal for the piezo-electric element 13.

For the explanation of the present invention following below, the following symbols are used with reference to FIG. 2a.

A, B, C, D: output signals of the respective quadrants of the quadrant detector in the order mentioned above (see FIG. 2a);

$FOC = (A+C) - (B+D)$, the uncorrected focussing signal;

$FOC' =$ the FOC signal corrected for the wander effect;

$V_c = (A+B) - (C+D)$, the vertical correction signal, which is a measure for the vertical decentring;

$H_c = (A+D) - (B+C)$, the horizontal correction signal, which is a measure for the horizontal decentring;

$\Sigma = A+B+C+D$, the sum signal, which is a measure for the intensity of the laser beam.

It has been established by experiments that upon varying the output high-tension of circuit 12 for the piezo-electric element 13 from FIG. 1 between 0 and 1000 V, which corresponds with a displacement of 40 $\mu$m of the focussing objective lens 6, in the worst case values are obtained for $H_c$ and $V_c$ which result in inadmissible faults in the regulating signal for the focussing objective lens, if no correction for the wander effect would be applied.

FIG. 2b shows a laser beam shifted with respect to the quadrant detector 9 wherein the axes through the diameter of the detector are shown in continuous lines and those through the centre of the laser beam are shown in dotted lines.

In the following calculation it is assumed that the laser beam still impinges completely on the sensitive surface of the quadrant detector and that the distribution of the intensity of the laser beam on the detector is totally uniform.

It appears from FIG. 2b that:

$$x_1 + y_1 = \frac{(A+B) - (C+D)}{2} = \frac{V_c}{2} \qquad (3)$$

It can also be deduced from FIG. 2b that approximatively:

$$\frac{x_1}{y_1} = \frac{A+D}{B+C} \qquad (4)$$

holds, which approximation is the more accurate according as $x_1$ and $y_1$ are smaller.

By means of the formulae (3) and (4) $x_1$ and $y_1$ can be calculated as well as a transformation of each of the quadrants of the quadrant detector, wherein the horizontal axis of the transformed detector coincides with the horizontal axis of the laser beam (see FIG. 2c).

It holds for the transformed quadrants that $$\begin{aligned} A' &= A - x_1 \\ B' &= B - y_1 \\ C' &= C + y_1 \\ D' &= D + x_1 \end{aligned} \quad \text{wherein:} \quad \begin{aligned} x_1 &= \frac{V_c}{2} \cdot \frac{A+D}{\Sigma} \\ y_1 &= \frac{V_c}{2} \cdot \frac{B+C}{\Sigma} \end{aligned} \qquad (5)$$

By means of a following transformation the transformed detector quadrants can be transformed once more in such a way that also the vertical axis of the laser beam coincides with that of the detector, so that the situation represented in FIG. 2d is obtained.

From FIG. 2c it can be deduced that $x_2 = y_2$ and that:

$$x_2 = \frac{(A+D)-(B+C)}{2} = \frac{H_c}{4} \tag{3}$$

so that for the completely transformed detector quadrants:

$$A'' = A - x_1 + x_2 \tag{6}$$

$$B'' = B - y_2 - x_2$$

$$C'' = C + y_1 - x_2$$

$$D'' = D + x_1 + x_2$$

The corrected focussing signal FOC' can be calculated herewith as a function of focussing signal FOC:

$$\begin{aligned}FOC' &= (A''+C'')-(B''+D'') \\ &= (A-x_1+y_2+C+y_1-y_2)-(B-y_1x_2+D+x_1+x_2) \\ &= (A+C)-(B+D)+2(-x_1+y_1) \\ &= FOC - 2\left[\frac{V_c}{2}\left(\frac{A+D}{\Sigma}\right) - \frac{V_c}{2}\left(\frac{B+C}{\Sigma}\right)\right] \\ &= FOC - \frac{V_c}{\Sigma}[(A+D)-(B+C)] = FOC - \frac{V_c H_c}{\Sigma}\end{aligned} \tag{8}$$

If a correction term having the value $V_c \cdot H_c/\Sigma$ is subtracted from the focussing signal $[(A+C)-(B+D)]$ the corrected focussing signal FOC' appears to procure a considerably more accurate focussing of the laser beam on the optical disc than without correction.

FIG. 3 shows a block scheme of a possible realization of an electronic circuit for generating formula 8.

The four segments of the quadrant detector, 9a, 9b, 9c and 9d emit the output signals A, B, C and D respectively. These output signals are added to a circuit 14, which emits the focussing signal $(A+C)-(B+D)$ as an output signal. The signals A, B, C and D are also added to the entry of circuits 15, 16 and 17, which circuits are built in a way known by itself so as to emit the signal $V_c = (A+B)-(C+D)$ at the output of circuit 15. Circuit 16 emits the sum signal $\Sigma = A+B+C+D$ at the output and circuit 17 emits the sum signal $H_c = (A+D)-(B+C)$ at the output. The output signals of circuits 15, 16 and 17 are coupled with entries of a circuit 18, which emits the signal $V_c H_c/\Sigma$ at the output.

The output signals of circuits 18 and 14 are coupled with entries of a circuit 19, which emits the signal $FOC' = FOC - V_c H_c/\Sigma$ at the output.

As a number of approximations has been applied upon calculating formula (8), while also there has been started from a uniform distribution of the laser beam over the detector and from a completely symmetrical quadrant detector, it appeared in practice that formula (8) is represented still better by:

$$FOC' = FOC - K_1 \frac{V_c H_c}{\Sigma}$$

Herein $K_1$ is an experimentally determined constant having a value between 1 and 2.

It appeared that the factors $H_c$ and $V_c$ are also especially useful upon optically aligning the optical components of the system according to FIG. 1. When $H_c$ and $V_c$ are minimal at different positions of the focussing objective lens, the alignment is optimal.

By moving now the focussing objective lens by means of a sinusoidally modulated high voltage and by observing simultaneously the values of $H_c$ and $V_c$ by means of an oscilloscope, e.g., the optical components can be set piece by piece in such a way that the variations in $H_c$ and $V_c$ are minimal as a result of the sinusoidally modulated high voltage.

FIG. 4 represents the course of the corrected focussing signal with reference number 1 as well as of the uncorrected focussing signal with reference number 2, both as a function of the product of the vertical correction signal with the horizontal correction signal.

If the microscope objective lens is regulated so that the test material is at focus distance, the exact value of the focussing signal can be read. Hereafter the position of the quadrant detector in a horizontal plane is changed. These changes simulate the wander effect. The focussing signal is recorded with and without correction circuit as a function of $H_c \times V_c$ because both of $H_c$ and $V_c$ are a measure for the faulty centring of the laser spot on the quadrant diode.

The improved focussing obtained by correction circuit for the wander effect is expressed by the ratio of the corrected focussing signal to the uncorrected focussing signal. This ratio equals 5 after linear interpolation of the measuring results for the realised embodiment as appears from FIG. 4.

I claim:

1. Device for focussing a laser beam onto an object, provided with a laser source, optical components for directing the laser beam to the object, mechanical and electronic means for controlling and correcting adjusting organs for the optical components, which electronic means comprise a quadrant detector which receives part of the reflected laser beam and detects form changes as a result of faulty focussing and also comprise a regulating circuit controlled by a focussing signal formed by the difference of the sums of the output signals of quadrants of the quadrant detector facing one another diagonally, assuming $(A+C)-(B+D)$; A, B, C and D being the output signals of each of the quadrants of the quadrant detector, when said quadrants are passed through clock-wise starting at the first top left quadrant, characterized thereby that electronic means are provided which by means of the four output signals of the quadrant detector generate a correction signal for the fault arising on focussing as a result of the faulty centering of the quadrant diode and the laser beam proportional to the value "$-V_c H_c/\Sigma$" wherein $$V_c = (A+B) - (C+D),$$

$$H_c = (A+D) - (B+C)$$

and $$\Sigma = A+B+C+D;$$

which correction signal is added to the focussing signal for controlling the regulating circuit.

2. Device according to claim 1, characterized thereby that said proportionality is expressed by a factor comprised between 1 and 2.

* * * * *